United States Patent [19]

Pütz

[11] 3,847,790
[45] Nov. 12, 1974

[54] TWO STAGE UREA DEWAXING PROCESS
[75] Inventor: Joachim Pütz, Offenthal, Germany
[73] Assignee: Edeleanu Gesellschaft mbH, Frankfurt, Germany
[22] Filed: July 24, 1972
[21] Appl. No.: 274,714

[30] Foreign Application Priority Data
July 31, 1971  Germany.............................. 2138428

[52] U.S. Cl............................... 208/25, 260/96.5 C
[51] Int. Cl............................................. C07b 21/00
[58] Field of Search................... 208/25; 260/96.5 C

[56] References Cited
UNITED STATES PATENTS
2,861,941  11/1958  Jancosek et al. ...................... 208/25
2,917,447  12/1959  Hoppe et al. ......................... 208/25

Primary Examiner—Herbert Levine
Attorney, Agent, or Firm—Thomas H.. Whaley; C. G. Ries

[57] ABSTRACT

A urea dewaxing process wherein normal paraffins are combined with aqueous urea solution in two, sequential, adduct-forming stages produces high purity normal paraffins. Employing fresh solvent washing of the adduct in both filtering steps permits the simultaneous production of low pour mineral oil and high purity normal paraffins.

11 Claims, 1 Drawing Figure

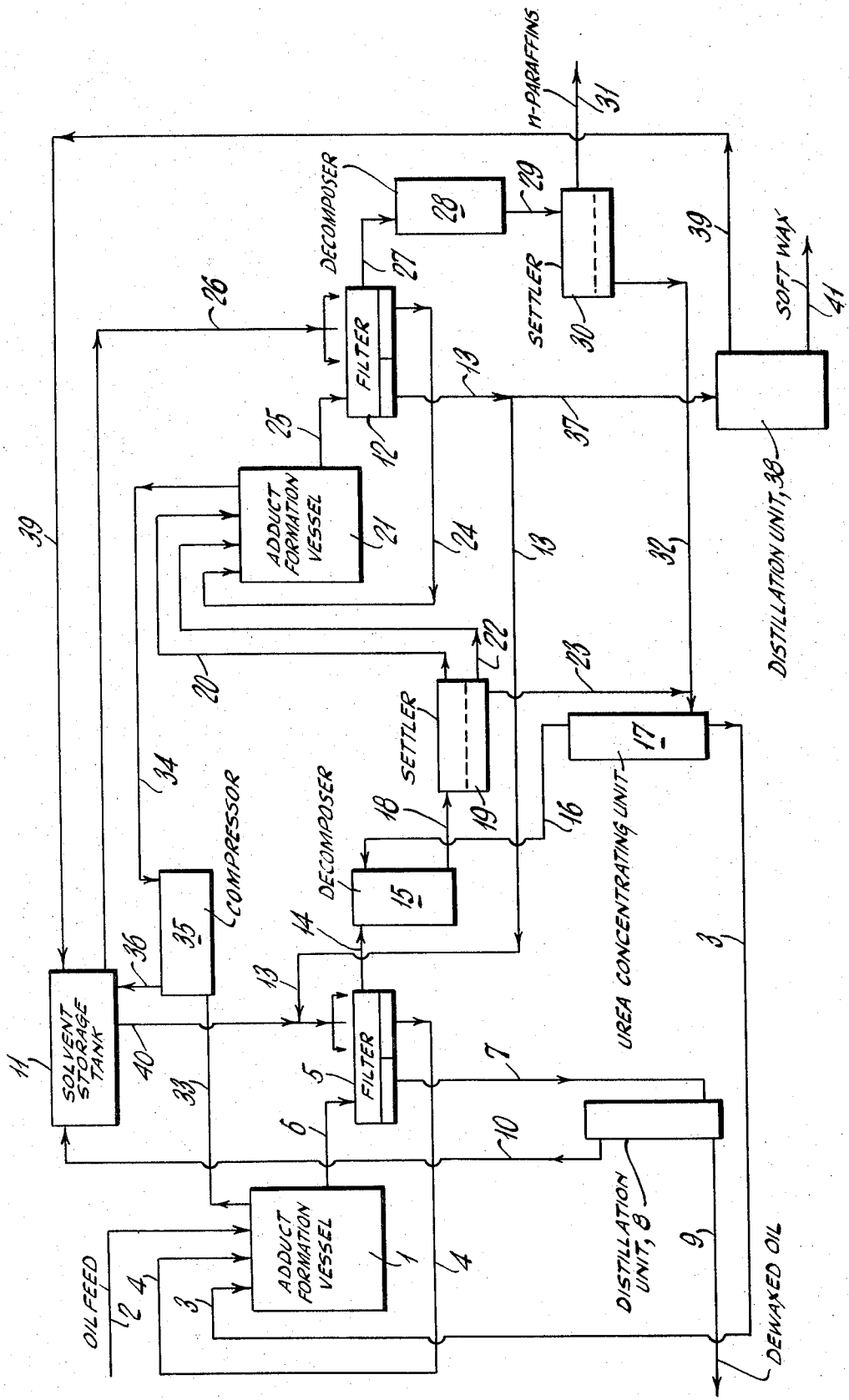

TWO STAGE UREA DEWAXING PROCESS

BACKGROUND OF THE INVENTION

This invention relates to the production of high purity normal paraffins and, optionally, low pour point mineral oils. It particularly relates to improvements in a urea dewaxing process to permit simultaneous production of high purity n-paraffins and low pour point mineral oils.

Mineral oil or crude oil is known to contain normal paraffins in varying concentrations. When a mineral oil fraction is used, for example, as a fuel oil or a lubricating oil, the n-paraffins contained therein can be troublesome because of their relatively high solidification point. Therefore, these n-paraffins are removed from the mineral oils on a commercial scale. The n-paraffins are valuable starting materials for commercial waxes, hard waxes, polishing materials and the like and their derivatives are used in the production of, for example, wetting agents and detergents, as well as for other purposes. The mineral oil fractions from which n-paraffins may be separated are available in sufficient quantities; however, with known processes it is often difficult to isolate them at reasonable costs and with the degree of purity required for their end uses.

A known method of removing n-paraffins from mineral oil distillates is by precipitating the n-paraffins by cooling, usually after diluting the mineral oil with solvents, and separating them in their crystalline form. However, this method yields n-paraffins of a purity not sufficient for many uses and it requires handling and distilling considerable amounts of solvent as well as a considerable amount of cooling capacity.

Normal paraffins of greater purity are obtained by the well known urea dewaxing process wherein the n-paraffins are eliminated from the mineral oil fraction by formation of crystalline adducts with urea. The pour point of the dewaxed mineral oil frequently is considerably lower than that of the starting material. In a very commonly employed modification of this urea dewaxing process, aqueous solutions are used in the presence of a low-boiling oil solvent or solvent mixture and the crystalline adduct, after being eliminated from the filtrate (primary filtrate) is, first, washed in order to remove the adherent mineral oil components. Afterwards, the crystalline adduct is decomposed by the influence of heat, water or oil solvent, used individually or in combination. From the organic phase obtained by the decomposition, relatively pure n-paraffins may be obtained. From the aqueous phase of the urea adduct decomposition, urea or urea solution is recovered and recycled to the adduct formation step. Further, the oil solvent is recovered from the filtrates obtained during adduct washing (wash filtrate) and adduct filtration (primary filtrate) and is reused for adduct formation and adduct washing, respectively.

In commercial practice, for technical and economical reasons, the above described urea dewaxing process is carried out under conditions that do not guarantee absolute selectivity for n-paraffins. It is known to further improve the selectivity of the process by repeating the adduct formation several times successively, each time using small amounts of urea. This fractional adduct formation, however, is extremely expensive, for example, with respect to the time required for each individual adduct fraction to attain good filtering characteristics. It was also known to further purify urea adducts by recrystallization from solvents or aqueous urea solution, the latter leading to re-adduction. However, these measures have proved to make the commercial dewaxing process quite complicated. In addition these techniques produce substantial amounts of undesirable by-products.

In practice, in addition to the n-paraffins, minor amounts of the remaining components of the mineral oil pass within the adduct, with the operating conditions of the commercial urea dewaxing process being so selected that only one of the end products, viz. a dewaxed low pour mineral oil or an n-paraffin mixture, is obtained meeting required demands and specifications. Since it was not possible by the prior art process to obtain simultaneously both products meeting quality and purity specifications at reasonable costs, the more valuable product has been given preference at the expense of the quality of the other end product. Consequently, the process has had to be altered frequently following changes of the market situation which required production of the end product which heretofore had been downgraded to benefit production of the other product. However, these alterations are complicated, time-consuming and subject to losses caused by the necessary purging of the plant.

It is, therefore, the object of this invention to improve the urea dewaxing process such that both n-paraffins with a degree of purity making further treatment unnecessary and, if desired, a high-quality filtrate oil having a low pour point may be obtained simultaneously, without interruption of the production process.

SUMMARY OF THE INVENTION

To achieve the object of this invention the adduct formation in a urea dewaxing process comprises two stages wherein the n-paraffins obtained by decomposing the adduct formed in the first stage are reacted again with urea in a second stage in such a fashion that only part of the amount of urea used in the first stage is employed in the second stage. Where only high purity n-paraffins are required, the first stage adduct is washed with the primary filtrate from the second stage, the second stage adduct is washed with fresh solvent and the wash filtrate from each stage is employed as diluent in the adduct-forming step of the stage. Where the simultaneous production of high purity n-paraffins and low pour mineral oil is desired, fresh solvent is employed for washing the adduct in both stages.

BRIEF DESCRIPTION OF THE DRAWING

The accompanying drawing is a schematic flow diagram of an embodiment of the process units and flow systems suitable for carrying out the process of the present invention.

DESCRIPTION OF THE PREFERRED EMBODIMENTS

This invention relates to a method for the simultaneous production of pure n-paraffins and low pour mineral oils from n-paraffin-containing mineral oil which comprises treating said n-paraffin-containing mineral oil in several steps using urea, especially aqueous urea solutions, in the presence of a low-boiling oil solvent or a solvent mixture containing a low-boiling component, separating the formed urea-n-paraffin adducts from the filtrate, obtaining mineral oil having a lower pour point and recovering the oil solvent from said filtrate, washing said adducts with said oil solvent, decomposing the washed products by the addition of heat, water or oil solvent, either individually or in combination, obtaining n-paraffins from the organic phase and recovering urea, or urea solution, from the aqueous phase of the decomposition product, and, optionally, recycling the recovered oil solvent and/or recovered urea or urea solution to the step of adduct formation, characterized by conducting the adduct formation comprising at least two steps in such a manner that the n-paraffin obtained by decomposition of the adduct in the first step of adduct formation is reacted once again with urea in a second step of adduct formation, wherein the amount of reactive urea used to form the adduct in said second step is only part of the amount of reactive urea used in said first step, washing the adduct obtained in said first step with the primary filtrate from said second step, washing the adduct obtained in said second step with fresh oil solvent, and using the filtrates formed in each step during washing of the adducts for diluting the adduct-forming mixture introduced into that same step.

The object of this invention is achieved in the following manner:

The charge oil is reacted, in a first step of adduct formation, with aqueous urea solution saturated at 70°C, the amount of urea being such that a complete separation of all n-paraffins occurs. A simultaneous adduction of isoparaffins present is tolerated to a limited extent. The adducts are formed in the presence of a solvent which has already been used as wash agent in the subsequent first filtration step of the process.

Among the oil solvents commonly employed are low boiling oil solvents used alone or as part of a mixture including low molecular weight aliphatic branched chain alcohols, cyclic alcohols, ethers, ketones, hydrocarbons and chlorinated hydrocarbons as well as some aromatics and naphthenes. Specific examples include isohexanol, cyclohexanol, diethyl ether, butanone, isopentane, isohexane, dichloromethane (methylene dichloride), dichloroethane, benzene and methylcyclopentane with the low molecular weight hydrocarbons and the chlorinated hydrocarbons being particularly preferred.

The entire mixture of the first step of adduct formation is separated in the subsequent first filtration step into its phases (solid phase: adduct, liquid phase: dewaxed oil plus oil solvent). In a preferred embodiment, a means for separation is used permitting intensive washing of the adduct after it has been separated from the primary filtrate and separately withdrawing the primary filtrate and the wash filtrate. The primary filtrate from the first filtration step (primary filtrate I), which is a mixture of solvent and non-adducted oil components, is resolved into dewaxed oil and oil solvent in a distillation unit. The oil solvent is reused in the process. The adduct which has remained on the filter is washed in order to remove adherent oil residues. The wash agent is the mixture of oil solvent and non-adducted hydrocarbons withdrawn from the second filtration step (primary filtrate II). This washing supplies a wash filtrate which, as already mentioned, is introduced into the first step of adduct formation. With respect to further use of the wash filtrate, the amount of wash agent is selected so that not only is the heat developed by the adduct formation carried away by the evaporating oil solvent but also the solids content in the adduct formation vessel is kept within limits to insure good mixing of the vessel contents during the adduct formation. The amount of wash agent may be smaller here than that in the second step of adduct formation, because the non-adductible oil components which are present act as diluent, thus reducing the concentration of solids.

The solid adduct is decomposed under addition of heat and water in a decomposer located downstream from the filter and the decomposition products are separated in a settler into two liquid phases. The n-paraffin phase which, because of the reaction equilibrium prevailing in the first step of adduct formation contains n-paraffins and also a portion of isoparaffins, is reacted again, in a second step of adduct formation, with aqueous urea solution, which is the aqueous urea phase withdrawn from the first decomposer. This aqueous urea solution is of reduced concentration, as compared to the initial concentration of the aqueous urea solution used in the first adduct formation vessel, due to the addition of water to the decomposer. In addition, since the aqueous urea solution is used only to the extent that the amount of reactive urea is from 10 to 95, preferably from 40 to 80 percent, of the amount of urea used in the first adduct formation vessel, the reaction equilibrium and, thus, the selectivity have been shifted such that, except for a negligible residue of isoparaffins, only n-paraffins form adducts in the second step.

If, the adduct decomposition is not carried out under the addition of heat and water but under the addition of heat and/or solvent, the urea concentration of the resultant urea solution is not reduced. In order to achieve the desired improvement of the selectivity in the second adduct formation step, the adduction temperature is raised by about 3° to 5°C. Even when operating in this manner, the amount of reactive urea used is from 10 to 95, preferably from 40 to 80, percent of that used in the initial adduct formation. The concentration of the non-adductible oil components in the second adduct forming step is greatly decreased compared to their concentration in the first adduct-forming step. The risk of these oil residues being included in the cavities of the adduct granules is thus almost eliminated and a washing with fresh oil solvent yields a very pure n-paraffin adduct. The wash filtrate from the second filtration step is also recycled to the second adduct formation vessel and functions in the same manner as the wash filtrate in the first adduct formation vessel, namely, to control the temperature and the solids concentration. Using the solvent as a means for temperature control in the adduct formation steps results in a decrease of the amount of solvent used in the process. Therefore, the initial amount of solvent is selected so as to provide enough oil solvent in the first adduct-forming step to maintain the concentration of solids required for good mixing. As already described, the primary filtrate II withdrawn from filtration step II serves as wash agent in filtration step I.

The washed adduct is decomposed by heat alone in the subsequent decomposer, if the first decomposer was operated under addition of water. As a result of using diluted urea solution in the second step of adduct formation, the amount of water bound in the adduct is so large that a further addition of water can be omitted. If however, the decomposition in the first step is carried out without added water, it is useful to carry out the decomposition in the second step with heat and in the presence of oil solvent.

The phases withdrawn from the decomposer are recovered separately. The solvent is evaporated from the n-paraffin phase and the diluted aqueous urea solution is re-concentrated to 70°C saturation in the concentrator. The excess amount from the first settler also is fed to the concentrator.

The advantage of operating the process with two steps of adduct formation is that a very pure n-paraffin is obtained, with a limited amount of solvent passing in countercurrent direction to the charge material. This method of handling the solvent in a countercurrent direction, wherein the solvent, charged in a single batch, serves both as wash agent in both filtration steps and as diluent in both steps of adduct formation, permits optimum use of these operations and eliminates fresh solvent additions in each step of adduct formation and washing thereby saving substantial amounts of heat energy otherwise necessary for the recovering of the solvent. Also, the installation of two adduct-forming steps does not involve additional use of urea, since the aqueous urea solution formed in the first decomposer is reused in the second step of adduct formation. The immediate reuse thereof without reconcentration saves heat energy and avoids urea losses caused by hydrolysis in a boiling aqueous urea solution.

The dewaxed oil obtained is of medium quality due to the amount of soft n-paraffins in primary filtrate II being recycled to the first adduct formation step. These soft n-paraffins pass into the dewaxed oil withdrawn from this step. If the two-step process does not meet the n-paraffin purity requirements, further adductforming zones may be installed.

If, however, a high-quality oil having a low pour point is desired in addition to the high-quality paraffin, the recycle of primary filtrate II to the first filtration step is omitted, the oil solvent and soft paraffins in primary filtrate II are separated in an additional distillation step and fresh solvent (instead of primary filtrate II) is used for washing in the first filtration step. By so modifying the process, i.e., by installation of the last mentioned distillation step and employing fresh solvent wash in the first filtration step, two highly valuable end products are obtained simultaneously, namely, pure n-paraffins and filtrate oils having very low pour points. Changing the mode of operation of the process to this particular embodiment does not require prolonged purging of the unit, in fact wash solvent is saved and production losses are avoided as compared to a "blocked out" operation for producing both products.

The following examples illustrate the two embodiments of the process.

EXAMPLE I

Production of n-paraffins and a dewaxed oil having a medium pour point.

EXAMPLE II

Production of n-paraffins and a dewaxed oil having a low pour point.

SUMMARY OF EXAMPLES

|  | Example I | Example II |
| --- | --- | --- |
| Charge | 100 parts by vol. of oil, pour point +15°C | 100 parts by vol. of oil, pour point +15°C |
| Oil solvent charged | 270 parts by vol. | 270 parts by vol. |
| Purpose of use of oil solvent | as wash agent in 2nd filtration step | as wash agent in 2nd filtration step |
| Further addition of oil solvent | — | 210 parts by vol. |
| Purpose of use of added oil solvent | — | as wash agent in 1st filtration step |
| Total charge, oil solvent | 270 parts by vol. | 480 parts by vol. |
| Yield, dewaxed oil | 90 parts by vol. | 85 parts by vol. |
| Pour point | −8°C | −24°C |
| Yield, n-paraffin | 10 parts by vol. | 10 parts by vol. |
| Purity | 99% | 99% |
| Yield, soft paraffins | — | 5 parts by vol. |

EXAMPLE I

Referring to the accompanying schematic flow diagram, one hundred parts by volume of a mineral oil fraction having a pour point of 15°C and introduced via line 2 are reacted with 80 parts by volume of an aqueous urea solution (70°C saturation) supplied via line 3, in adduct formation vessel 1. 220 parts by volume of diluent are simultaneously added via line 4. This diluent is the wash filtrate withdrawn via line 4 from filter 5 and consisting of 210 parts by volume of oil solvent (e.g., methylene chloride or light hydrocarbons), 5 parts by volume of soft paraffin and 5 parts by volume of nonadductible oil. The contents of the adduct formation vessel 1 are passed, via line 6, onto filter 5 where primary filtrate I is withdrawn via line 7 from the inlet section and passed to distillation unit 8. From the distillation unit, the dewaxed oil is withdrawn via line 9, and the oil solvent is carried to the storage tank 11 via line 10. Oil yield: 90 parts by volume, pour point −8°C.

The solid adduct which has remained on the filter 5 is washed with 210 parts by volume of primary filtrate II withdrawn from filter 12 via line 13. The washed adduct leaves filter 5 and it is carried by line 14 to decomposer 15 where it is decomposed under heating and the addition of 3 parts by volume of warm water supplied from the urea concentrating unit 17 via line 16. The decomposition mixture is passed via line 18 to settler 19 where it settles and forms two liquid phases, an n-paraffin-containing phase and a diluted aqueous urea phase. The n-paraffin-containing phase is passed via line 20 to adduct formation vessel 21 for a second adduct formation with a portion of the diluted aqueous urea phase (65°C saturation) admitted via line 22. The unused portion of the aqueous urea phase is passed via line 23 to the urea concentrating unit 17. The diluent for the second adduct formation is the wash filtrate withdrawn from filter 12 via line 24. The streams added to the adduct formation vessel 21 are: 15 parts by volume of paraffin hydrocarbons, 60 parts by volume aqueous urea solution (65°C saturation) and 270 parts by volume of wash filtrate.

The adduct mixture is passed via line 25 onto filter 12. Primary filtrate II from filter 12 is withdrawn via line 13 and passed to filter 5 as wash agent. The adducts on filter 12 are washed with 270 parts by volume of fresh oil solvent introduced via line 26. The adducts then are passed via line 27 into decomposer 28 where they are decomposed into their components by the influence of heat. The resolved mixture of components is conducted via line 29 to settler 30 where it separates into two liquid phases. The n-paraffins discharged from the settler via line 31 are passed to a stripper, or the like, for removing the remaining solvent to yield 10 parts by volume of pure normal paraffins. The aqueous urea phase is passed via line 32 to the urea concentrating unit 17. The solvent vapors escaping from the adduct formation vessels 1 and 21 flow, via lines 33 and 34, respectively, to compressor 35 and, after cooling, via line 36 to storage tank 11.

EXAMPLE II

The second embodiment of the process of the invention is distinguished from the first, described in Example I, by the following modifications:

Primary filtrate II withdrawn from filter 12 is not employed as the wash agent on filter 5 but is introduced via lines 13 and 37 into distillation unit 38 where the oil solvent is recovered and subsequently recycled via line 39 to the storage tank 11. From distillation unit 38, 5 parts by volume of soft n-paraffins are withdrawn via line 41.

The adduct on filter 5 is washed with fresh oil solvent introduced via line 40. The filtrate oil recovered from distillation unit 8 through line 9 in a yield of 85 parts by volume has a pour point of −24°C.

I claim:

1. In a two stage urea dewaxing process for the simultaneous production of high purity normal paraffins and dewaxed mineral oil from a mineral oil feedstock containing normal paraffins and a lesser quantity of isoparaffins where, in each stage, an adduct of urea and normal paraffins is formed from admixtures of normal paraffins, aqueous urea solution and the wash filtrate from that stage comprising an oil solvent, the adduct-forming mixture is separated into a liquid stream and the solid adduct, the liquid stream is utilized as a wash stream in the other stage or is processed to recover dewaxed oil, the adduct is washed with a wash stream comprising oil solvent and the adduct is decomposed to produce a normal paraffin-containing stream and an aqueous urea stream, the improvement which comprises:

a. forming the adduct for the first stage with sufficient urea to form an adduct of substantially all of the normal paraffins together with a portion of the isoparaffins in the feedstock, the adduct being formed from an admixture comprising the feedstock, a first aqueous urea solution and the first stage wash filtrate from step (d), b. separating the adduct of step (a) from the admixture of step (a) to yield a first stage primary filtrate and a first stage adduct, c. recovering dewaxed oil and oil solvent from the first stage primary filtrate, d. washing the first stage adduct with a wash stream comprising oil solvent producing a first stage wash filtrate, e. decomposing the washed first stage adduct to form a feed stream for the second stage comprising normal paraffins and isoparaffins and a second aqueous urea solution, f. forming the adduct for the second stage from the feed stream for the second stage and a limited quantity of urea to form an adduct of normal paraffins substantially free of isoparaffins, the adduct being formed from an admixture comprising the feed stream for the second stage, a portion of the second aqueous urea solution, and the second stage wash filtrate from step (h), g. separating the adduct of step (f) from the admixture of step (f) to yield a second stage primary filtrate and a second stage adduct, h. washing the second stage adduct with a wash stream comprising fresh oil solvent producing a second stage wash filtrate, i. decomposing the washed second stage adduct to form a normal paraffin-containing stream and a third aqueous urea solution, and j. recovering normal paraffins from the normal paraffin-containing stream.

2. A process according to claim 1 wherein the wash stream of step (d) is fresh oil solvent and the second stage primary filtrate of step (g) is separated to yield soft normal paraffins and oil solvent.

3. A process according to claim 1 wherein the wash stream of step (d) is the second stage primary filtrate of step (g).

4. A process according to claim 1 wherein the quantity of urea used in step (f) to form the second stage adduct is 10 to 95 wt. percent of the quantity of urea used in step (a) to form the first stage adduct.

5. A process according to claim 4 wherein the quantity of urea used in step (f) is 40 to 80 wt. percent of the quantity used in step (a).

6. A process according to claim 1 wherein the first aqueous urea solution of step (a) is saturated with urea at 70°C. and the second aqueous urea solution of step (f) is saturated with urea at 65°C.

7. A process according to claim 1 wherein the decomposition of step (e) is achieved by the addition of heat and water to the adduct, the water being added in sufficient quantity to produce the second aqueous urea solution.

8. A process according to claim 1 wherein the decomposition of step (e) is achieved by the addition of heat and without the addition of water and the temperature used in step (f) to form the adduct is 3° to 5°C. higher than the temperature used in step (a) to form the adduct.

9. A process according to claim 1 wherein the oil solvent is selected from the group consisting of low molecular weight aliphatic branched-chain alcohols, cyclic alcohols, ethers, ketones, hydrocarbons, chlorinated hydrocarbons, aromatics and naphthenes.

10. A process according to claim 9 wherein the solvent is selected from the group consisting of isohexanol, cyclohexanol, diethyl ether, butanone, isopentane, isohexane, benzene and methylcyclopentane.

11. A process according to claim 9 wherein the solvent is selected from the group consisting of dichloromethane and dichloroethane.

* * * * *